Aug. 11, 1936.  C. H. KINDL  2,050,953

SHOCK ABSORBER

Filed July 30, 1932

Inventor
Carl H. Kindl

By Spencer, Hardman and Fehr
Attorneys

Patented Aug. 11, 1936

2,050,953

UNITED STATES PATENT OFFICE 2,050,953

SHOCK ABSORBER

Carl H. Kindl, Dayton, Ohio, assignor, by mesne assignments, to General Motors Corporation, Detroit, Mich., a corporation of Delaware Application July 30, 1932, Serial No. 626,430

9 Claims. (Cl. 188—88)

This invention relates to improvements in hydraulic shock absorbers, particularly adapted for use on motor driven vehicles.

Various designs in hydraulic shock absorbers, both single and double-acting, have been used to cushion or control the actions of the vehicle springs. Single-acting shock absorbers are adapted to control only the rebounding movements of the vehicle springs, said rebounding movements occurring when there is a separating movement between the vehicle frame and the axles. Double-acting shock absorbers control the compression movement of the vehicle springs as well as the rebounding movement thereof. Both manually operable and automatic devices have been provided with such shock absorbers for varying the degree of resistance offered by the shock absorber to such spring actions.

The present invention contemplates among its objects the provision of an automatic control device for the hydraulic shock absorber which device will, in response to accelerative movements of the part of the vehicle to which the shock absorber is attached, adjust the shock absorber to increase its resistance to body and axle movements in proportion to said movements.

Among other objects of the invention is the utilization of fluid pressure developed within the shock absorber for the adjustment of the shock absorber, the application of said pressure being controlled in response to and proportional to accelerative movements of the shock absorber itself.

A still further object of the invention is to adjust the shock absorber only in response to and proportionately with the accelerations in the movements of the vehicle frame to which the shock absorber is attached, and particularly to the movements of the vehicle frame in a direction away from the axle upon which said frame is supported by the vehicle springs.

Further objects and advantages of the present invention will be apparent from the following description, reference being had to the accompanying drawing wherein a preferred embodiment of one form of the present invention is clearly shown.

In the drawing:

Fig. 1 is a longitudinal sectional view of the shock absorber taken substantially along the line 1—1 of Fig. 2.

Fig. 2 is a longitudinal sectional view taken substantially along the line 2—2 of Fig. 1.

Fig. 3 is a fragmentary side view of a vehicle chassis with wheels removed, a shock absorber embodying the present invention being shown attached to the frame of the vehicle.

Referring to the drawing, the numeral 20 designates the shock absorber as a whole, the casing of the shock absorber being designated by the numeral 21. This casing provides a fluid reservoir 22 and a cylinder 23, both being in communication. A shaft 24 is journalled in bearings provided by the inwardly extending lugs 200 formed in said casing. One end of the shaft extends to the outside of the casing and has the shock absorber operating arm 25 attached thereto. The free end of said arm is swivelly connected with one end of a link 26. The opposite end of said link is swivelly attached to a member 27 which is secured to the vehicle axle 28 by a clamping member 29. The springs of the vehicle designated by the numeral 30 are supported upon the axle 28, said springs in turn supporting the vehicle frame 31 as shown in the Fig. 3. The shock absorber 20 is bolted to the frame 31 by bolts passing through holes in the casing, one of said holes being shown as at 33.

The shaft 24 journalled transversely of the casing has a rocker arm 35 attached thereto within the casing, said rocker arm having a rounded head portion 36 which is adapted to engage the piston 37 reciprocably supported within the cylinder 23 for purposes of reciprocating said piston when the shock absorber operating arm 25 is oscillated.

Piston 37 within the cylinder forms a compression chamber at each end thereof, the chamber 40 at the one end being termed the "spring rebound control chamber" and 41 at the other end the "spring compression control chamber". As shown in Figs. 1 and 2, the ends of the cylinder are closed by cylinder head caps 42 and 43.

Referring particularly to Fig. 1, the piston 37 is shown comprising two portions 45 and 46 held together by two bolts 47 and 48. Bolt 47 extends through a passage in the piston portion 45 and threadedly engages an aligned opening in the piston portion 46. A spring 49 is interposed between the head of bolt 47 and the piston portion 45, thereby urging the piston portion 45 toward the piston portion 46. Similarly, bolt 48 extends through a smooth channel or passage in the piston portion 46 and threadedly engages an aligned passage in the piston portion 45, a spring 50 being interposed between the head of bolt 48 and the piston portion 46, thus yieldably urging the piston portion 46 toward the piston portion 45. The adjacent ends of the piston portions 45 and 46 are recesssed as at 51 and 52 providing a central opening for receiving the rounded head or end 36 of the rocker arm 35. A wear-button 53 is carried by each piston portion 45 and 46 so as to be engaged by the rounded end 36 of the rocker arm 35. From this it may be seen that springs 49 and 50 of the respective bolts 47 and 48 of piston portions 45 and 46 urge these piston portions toward each other so that their wear-buttons 53 are substantially maintained in engagement with the rounded end 36 of the rocker arm.

Each piston head portion has a passage providing communication between its respective compression chamber and the intermediate chamber 202 which is formed by a bulge in the casing and which is in constant communication with the fluid reservoir 22 and each of these passages have valve mechanisms which control the fluid flow therethrough. Inasmuch as both valve mechanisms of the respective piston head portions are alike, only one of them will be described detailedly.

Referring to the piston head portion 45, the passage therethrough is designated by the numeral 60. An annular valve-seat 61 is provided within the piston head portion 45 about the end of passage 60. The intake valve 62 is adapted to engage the annular seat 61 in response to the action of spring 63 which is interposed between valve 62 and an abutment ring 64 secured within the piston head portion 45. Valve 62 has a tubular portion 65 in which the pressure release valve 66 is slidably supported. This pressure release valve comprises a tubular body portion 67 having a button head 68 adapted to rest upon the outer surface of the intake valve 62 as shown in Fig. 1. A spring 69 is interposed between valve 62 and an abutment collar 70 fastened to the tubular body portion 67 of the pressure release valve, this spring 69 yieldably urging the button head 68 of the pressure release valve upon the outer surface of the intake valve 62. A side opening 71 in the tubular body portion 67 of the intake valve is normally within the confines of the intake valve 62 and thus does not establish a flow through the intake valve until said valve is moved so that its button head 68 disengages from the intake valve 62, at which time the opening 71 is uncovered.

The valve mechanism functions as follows:

In response to the movement of the piston head 45 toward the right as regards Fig. 1, which movement occurs when the vehicle spring 30 is compressed or moved toward the frame 31, the fluid in the reservoir exerting a pressure through passage 60 will move the entire valve mechanism including intake valve 62 from the annular seat 61 to establish a substantially free flow of fluid from the reservoir through passage 60 past the valve 62 into the chamber 40. Upon reversal of this movement in response to the rebounding movement of the vehicle springs, that is, the movement of the vehicle springs 30 away from frame 31, piston 45 exerting a pressure upon the fluid within chamber 40, will cause said fluid, when it has attained the proper fluid pressure, to move valve 67 slidably within the valve 62, against the effect of spring 69, to uncover the side opening 71 in said valve 67 and thereby establish a restricted flow of fluid from the chamber 40 through the valve 67 and its side opening 71 into passage 60 and thence into the reservoir. It must be remembered at this time, however, that this latter flow will only be established when a predetermined high pressure within chamber 40 is to be relieved.

For purposes of a complete description to follow, passage of piston portion 46 will be designated by the numeral 80, the intake valve of this piston portion 46 by the numeral 82, and the pressure release valve by the numeral 88.

As stated in the objects of the invention, the present invention contemplates the provision of an automatic control device which, in response to accelerative movements of the frame of the vehicle will adjust the shock absorber to increase its resistance to body and axle movements in proportion to said movements. This device is clearly illustrated in the Fig. 2 and will now be described detailedly.

Referring particularly to Figs. 1 and 2, a duct 90 is shown within the casing leading from the spring compression control chamber 41 into a recess 91. This recess 91 has portions of varying diameters, the smallest or lowest portion 92 being in communication with the spring rebound control chamber 40 through the duct 93. The portion 94 is that which is in direct communication with the duct 90, this portion 94 being slightly larger in diameter than the portion 92. Interior threads are provided in the portion 94 as shown in Fig. 2. Above portion 94 is a larger diameter portion 95 forming what may be termed the control cylinder, the upper end of this cylinder being interiorly threaded as shown in Fig. 2. Portion 95 is in communication with a still larger portion 96 above it, which portion 96 provides a chamber containing the inertia weight control device and which communicates with the reservoir 22 through an opening 196 in the chamber wall.

The threaded portion 94 of the recess 91 receives a tubular plug 97 having a cross passage 98 in communication with duct 90 when said plug 97 is screwed into the recess 94 so that its bottom end engages with a washer provided upon the shoulder 99 presented by the two different diameter portions 92 and 94 of said recess. Within the hollow plug 97 there is provided an annular ridge forming a valve seat 100 which extends upwardly into alignment with the cross passage 98 as shown in Fig. 2. Tubular plug 97 slidably supports a tubular valve 101, the lower end of which is adapted normally to rest upon the valve seat 100. This tubular valve 101 has its inner passage partially threaded to receive the metering screw 102, this screw being hollow, the inner passage of which having a restriction 103 preferably at the upper end or head portion of the screw as shown in Fig. 2. The screw 102 secures a piston to the tubular valve 101, the head of said screw 102 clamping the piston portions upon an exterior shoulder provided on the tubular valve 101. This piston comprises two metallic plates 104 and 105 between which is clamped a fibrous or leather washer 106, the outer edge of which is bent angularly and slidably engages the inner wall of the recessed portion 95 which, as has been mentioned, forms the control cylinder of the shock absorber. A screw plug 107 is secured within the interior threaded end of the cylinder portion 95, this screw plug having an interiorly threaded central opening 108 for receiving a hollow plug 109, the hollow plug having a central passage designated by the numeral 110 which provides communication between the recessed portion 96 and the control cylinder portion 95. A spring 111 is interposed between the screw plug 107 and the piston plate 105 normally urging the piston valve 101 into the position in which the lower end thereof engages the seat 100.

A ring-shaped plate 113 fits upon the casing 21 of the shock absorber about the chamber 96 therein and is maintained in proper position thereon by the cover plate 114 secured to the casing by screws 115. This cover plate 114 has proper gaskets to seal the chamber 96. The ring plate 113 has a depending ear 116. Cover plate 114 has two, spaced ear members 117 extending downwardly into the chamber 96, these ears 117 supporting a pin 118 which may be termed the hinge pin for the inertia weight element 120. The inertia weight element 120 has an extension hingedly engaging the pin 118. Upon one edge of the weight 120 there is secured a plate 121 to which one end of spring 122 is attached, the opposite end of said spring being anchored to the ear 116 of the ring plate 113. Normally this spring 122 lifts the weight 120 so that its upper surface engages the cover plate 114. In the Fig. 2 the weight 120 is not shown in the normal position, but in the position which it assumes in response to accelerative movements of the vehicle frame 31 upwardly. The weight member 120 has an adjustable screw plug 130 arranged centrally thereof, this screw plug having a recess 131 facing the hollow screw plug 109 carried in the plug 107. A tubular extension 132 on the screw plug 109 extends into the recess 131 of the plug 130, this tubular portion slidably carrying a valve 133, said valve having a tapered end adapted to seat into the upper end of the duct or passage 110 of the screw plug 109. When the weight 120 is held in normal position by spring 122, so that the end of its plate 121 engages the cover plate 114, valve 133 may be moved by fluid pressure away from the screw plug 109 to maintain the passage 110 open in said screw plug 109. However, in response to accelerative movements of the shock absorber casing 21 upwardly, weight 120 will engage valve 133 and urge it upon the screw plug 109 to close the passage 110 therein.

The duct 140 shown in dotted lines in Fig. 2, leads from the chamber 96 into the duct 141 which communicates with the recessed portion 95 below the piston of valve 101. This permits any fluid beneath the piston of valve 101 to flow freely into the chamber 96 and not to obstruct the operation of the piston valve. Chamber 96 in turn is in communication with the reservoir 22 through the hole 196 in its annular wall.

The operation of the device will now be described: when the road wheels of the vehicle strike an obstruction in the roadway, springs 30 will be compressed due to the thrust of the axle 28 toward the frame 31. This movement of the axle toward the frame causes the link connection 26 to move the shock absorber operating arm 25 counter-clockwise as regards the Fig. 3, and thus the rocker shaft 24 will be rotated in a similar direction, resulting in a movement of the piston 37 toward the right as regards Figs. 1 and 2. Pressure will now be exerted upon the fluid within the chamber 41, tending to urge the fluid from the chamber into the duct 90. The engagement of the valve 101 with the seat 100, however, will not permit fluid to flow from the duct 90 until a pressure has been attained in said duct sufficient to move valve 101 with its piston against the effect of spring 111, and when this occurs fluid may flow from duct 90 through the cross passage 98 down through the lower end of screw plug 97 into the recessed portion 92 thence through passage 93 into the spring rebound control chamber 40, the piston of which is at this time moving away from the piston head cap 42 and thus increasing the size of the chamber 40. If the obstruction met by the road wheels is sufficient to cause extensive movements of the piston 37 toward the right so that a greater fluid pressure is built up within the said chamber 41 than can properly be relieved by valve 101, then the fluid pressure release valve 88 in the piston will move to open position, thereby establishing a restricted flow of fluid from chamber 41 through the passage 80 in the piston portion 46, thence into the reservoir.

Following the compression of springs 30 they will tend to return to their normal load position with a rebounding movement, resulting in a reversal of movement of the shock absorber piston 37. Now the piston will be moved toward the left as regards Figs. 1 and 2 to exert a pressure upon the fluid within the chamber 40. The fluid from chamber 40 will be urged through passage 93 into the recess portion 92, thence through the tubular valve 101 and its restricted hollow screw 102 into cylinder 95 above the piston and through passage 110 in the screw plug 109 into the chamber 96, thence to the reservoir via passage 196. If the restriction 103 in the screw cap 102 is too great properly to relieve the fluid pressure, then valve 101 will be moved against the effect of spring 111 whereby fluid will flow from the recessed portion 92 through cross passages 98 into the duct 90 thence to the spring compression control chamber 41. Excessive pressures which cannot properly be relieved by valve 101 will cause pressure release valve 67 to move, whereby a flow will be established through the side opening 71 and passage 60 in the piston head portion 45 into the reservoir 22.

The striking of the obstruction in the highway which, as has been described, urges the axle 28 toward the frame 31, will start the frame 31 of the vehicle to move in an upwardly direction. The upward movement of the vehicle frame, if sufficiently accelerated, will cause a relative movement between the weight member 120 and the casing 21 of the shock absorber which casing is secured to the frame 31 of the vehicle. Consequently the valve 133 will be engaged and urged by the weight 120 to close the passage 110. Now the flow aforedescribed, that is, from the chamber 40 through duct 93, recess 192 to the hollow valve 101 and the screw 102 with its orifice 103, chamber containing spring 111 through passage 110 will be restricted or entirely shut off and as a consequence fluid pressure will begin to be built up within the chamber containing spring 111 thereby exerting a pressure upon the piston of valve 101 so that said valve will be urged toward the seat 101 with an increasing pressure and thereby increasedly restricting the fluid flow from recessed portion 92 through the hollow plug 97 through the orifice presented between the valve seat 100 and valve 101 into the duct 90 through the cross passages 98. This restriction of the fluid flow through duct or passage 110 by valve 133 in response to accelerative movements of the vehicle frame 31 upwardly consequently adjusts the shock absorber automatically to increase its restriction to the rebounding movement of the vehicle springs 30 thereby cushioning or retarding the said upward movement of the vehicle frame. If on the other hand the movements of the vehicle frame 31 do not reach a proper acceleration, the weight member 120 will have no effect to move valve 133 to close passage 110 and thus the shock absorber will be maintained to provide a substantially soft ride.

The spring 122 which maintains the weight 120 in normal position may be varied so that different accelerations in the upward movement of the car body may be required to render the pressure operated piston valve 101 effective to increase restrictions to the fluid flow from the rebound chamber to the compression chamber. At all times, however, is the pressure release valve 68 available to relieve excessive pressures which might build up within the chamber 40, thereby avoiding the possibility of breakage within the shock absorber, said pressure release valve acting primarily as a safety valve, the main control being effected by the valve 101 for movement of the vehicle springs.

In the present invention applicant has provided a device of simple structure and design adapted automatically to adjust itself in accordance with the nature of the road over which the vehicle is being operated, such adjustments being made in response to accelerative movements of the vehicle frame. The fluid pressure developed by the operation of the shock absorber is used in the present invention to supply the motive power to effect adjustment, the application of said power being under control of an inertia weight which, in response to accelerative movements of the vehicle frame in one direction, controls the operation of a valve, regulating power application.

While the form of embodiment of the present invention as herein disclosed, constitutes a preferred form, it is to be understood that other forms might be adopted, all coming within the scope of the claims which follow.

What is claimed is as follows:

1. An hydraulic shock absorber adapted to control both the approaching and separating movements of a vehicle frame and axle, comprising, means for circulating fluid within the shock absorber in response to such movements of the vehicle frame and axle; means adapted to control said fluid circulation; means for adjusting said control means to vary its restriction to the fluid circulation; and inertia controlled means for rendering said adjusting means effective only in response and proportionate to the accelerations of one of the relative movements of the vehicle frame and axle.

2. An hydraulic shock absorber adapted to control both the approaching and separating movements of a vehicle frame and axle, comprising, means for circulating fluid within the shock absorber in response to such movements of the vehicle frame and axle; means adapted to control said fluid circulation; means for adjusting said control means to vary its restriction to the fluid circulation; and an inertia weight controlled device adapted to render said adjusting means effective only in response and proportionate to the accelerations of the movement of the vehicle member to which the shock absorber is attached.

3. An hydraulic shock absorber adapted to control both the approaching and separating movements of a vehicle frame and axle, comprising, means for circulating fluid within the shock absorber in response to such movements of the vehicle frame and axle; a fluid flow control device adapted to control said fluid circulation; a fluid operated means adapted to adjust said device to vary its control over the fluid circulation; and an inertia weight controlled valve adapted to render said fluid operated means effective only in response and proportionate to the accelerations of the movement of the vehicle frame away from the axle.

4. An hydraulic shock absorber for resisting both approaching and separating movements of the frame and axle of a vehicle, said shock absorber having a casing and fluid circulating means therein; a spring-loaded valve adapted to control said fluid circulation; means for adjusting said valve to vary its control upon the fluid flow; and inertia weight controlled means adapted to render said adjusting means effective only in response and proportionate to accelerative movement of the vehicle part to which the casing is attached.

5. An hydraulic shock absorber comprising, in combination, a casing providing a cylinder; a piston in said cylinder forming two compression chambers therein; means adapted to establish a flow of fluid between said chambers in response to a predetermined fluid pressure therein; means for diverting a portion of the flow of fluid between said chambers; means adapted, in response to accelerative movements of the shock absorber casing, to restrict said diverted fluid flow and build up a back pressure; and means moved by said back pressure to actuate the pressure responsive means to increase its restriction to the flow of fluid between the chambers.

6. An hydraulic shock absorber having a fluid reservoir, two fluid compression chambers and means for circulating fluid between said chambers; a check-valve normally shutting off said fluid circulation but adapted, in response to a predetermined fluid pressure in either compression chamber to establish a flow into the chamber opposite, said valve being adapted also to establish a flow of fluid from the circulation of fluid established thereby into the fluid reservoir; an inertia weight actuated valve adapted, in response to accelerative movements of the shock absorber, to restrict said flow to the reservoir; and means, responsive to said restricted flow to the reservoir, for increasing the restriction by the check valve to the fluid circulation between compression chambers.

7. An hydraulic shock absorber having a fluid reservoir and a cylinder within which a reciprocative piston forms two compression chambers; ducts providing communication between the respective chambers and the said chambers and fluid reservoir; a spring loaded valve normally shutting off communication between the chambers and adapted to maintain communication between one of said chambers and the fluid reservoir; an inertia weight controlled valve adapted, in response to and proportionate to accelerative movements of the shock absorber, to restrict the flow from said chamber to the reservoir; and means engaging the spring loaded valve, and adapted, in response to the restriction of the fluid flow to the reservoir, to urge said spring loaded valve, increasedly to restrict the fluid flow between the respective chambers.

8. An hydraulic shock absorber having a casing providing a fluid reservoir and a cylinder; a piston in said cylinder forming two compression chambers therein; ducts in the piston providing communication between said chambers; pressure release valves normally closing said ducts; ducts in the casing connecting said chambers; a spring loaded valve normally closing communication between said chambers through said casing ducts; said valve, however, having a constantly open passage adapted to establish communication between one of said chambers and the fluid reservoir without movement of the valve; a fluid pressure operated means for adjusting said spring-loaded valve; and an inertia weight controlled valve adapted to render said pressure operated means effective to adjust the spring loaded valve in response to and proportionate to accelerations in the movement of the shock absorber casing in the one direction only.

9. An hydraulic shock absorber having a casing providing a fluid reservoir and a cylinder within which a reciprocative piston forms two compression chambers; ducts in the piston connecting said chambers; a check-valve at each end of the piston, closing a respective duct, one check-valve acting oppositely to the other; a duct in the casing connecting the two chambers; a side-duct leading from said casing duct into the reservoir, said side-duct having an enlarged cylindrical chamber between the casing duct and reservoir; a spring loaded valve normally closing the casing duct to shut off communication between the chambers, said valve, however, having a constantly open passage adapted to provide constant communication between the one compression chamber and reservoir without movement of the valve; a piston in the cylindrical chamber of the side-duct, and secured to the spring loaded valve; and an inertia weight controlled valve adapted, under influence of the inertia weight in response to and in proportion to accelerative movements of the casing in one direction, to close the side duct leading to the reservoir, whereby fluid pressure in the cylindrical chamber will urge the piston therein to urge the valve, attached to said piston, increasedly to restrict the fluid flow through the casing duct.

CARL H. KINDL.